US 6,529,589 B1

(12) United States Patent
Nelson et al.

(10) Patent No.: US 6,529,589 B1
(45) Date of Patent: Mar. 4, 2003

(54) METHOD AND SYSTEM FOR MONITORING AND CONTROLLING AUTOMATION EQUIPMENT BY MODEM

(75) Inventors: Jon A. Nelson, Magna, UT (US); Tim Urry Price, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/314,990

(22) Filed: May 20, 1999

(51) Int. Cl.$^7$ .............................................. H04M 11/00
(52) U.S. Cl. ............................. 379/102.01; 340/310.01
(58) Field of Search ...................... 379/102.01–106.01; 340/310.02, 310.08, 310.07

(56) References Cited

U.S. PATENT DOCUMENTS

| | | | |
|---|---|---|---|
| 4,996,703 A | * 2/1991 | Gray ...................... | 379/102.05 |
| 5,051,720 A | * 9/1991 | Kittirutsunetorn et al. ....... | 379/102.03 |
| 6,023,052 A | * 2/2000 | Carl, Jr. et al. .......... | 340/310.02 |
| 6,115,456 A | * 9/2000 | Nolde .................... | 379/102.01 |

OTHER PUBLICATIONS

Rye, Dave, "X–10 Power House, Technical Note, The X–10 Powerhouse Power Line Interface Model #PL513 and Two-Way Power Line Interface Model #TW523", Revision 2.4, pp. 1–12.

JM Control Systems, "Home Automation Commincations Protocols, " www.intcity.com/jmcontrol/comprotoc.html.

* cited by examiner

Primary Examiner—Wing F. Chan
(74) Attorney, Agent, or Firm—Workman, Nydegger & Seeley

(57) ABSTRACT

Methods, systems, and computer program products for monitoring and controlling automation equipment. The present invention uses a modem's processing and memory resources to interpret and translate data and commands associated with automation equipment. When receiving data from the automation equipment, the modem interprets the data using its own processing power and stores the interpreted results in its own memory for subsequent retrieval. Commands for control are translated into a compatible format by the modem and then transmitted to the automation equipment. The present invention also allows for remote access through the modem for both monitoring and controlling without requiring any host interaction. A modem according to the present invention further provides for its host to operate in a mode of reduced processing and power consumption while the modem continues to monitor and control automation equipment.

43 Claims, 6 Drawing Sheets

METHOD AND SYSTEM FOR MONITORING AND CONTROLLING AUTOMATION EQUIPMENT BY MODEM

BACKGROUND OF THE INVENTION

1. The Field of the Invention

The field of the present invention is network communications. More specifically, the present invention relates to methods, systems and computer program products for monitoring and controlling network connected automation equipment using the processing and memory resources of a modem.

2. The Prior State of the Art

At least in a primitive sense, automation equipment has existed for some time. Among the earliest and most familiar devices of general application were simple timers for turning appliances on and off. These timers are simple in design, amounting to little more than a device that plugs into an ordinary electrical socket with a corresponding electrical socket for the appliance to be controlled. By supplying and cutting off the flow of electricity, the timer can automatically turn a light on at dusk and then automatically turn the light off around bedtime. For many consumers, the primary value of these timers is not in saving the labor required to turn on a light or other appliance, but rather in giving the illusion that "someone is home."

Over the years, the applications for timers have greatly multiplied. For example, timers are used to control heating and air conditioning systems, lights, coffee makers, ovens, radios, television sets, VCRs, sprinkling systems and other devices. Unfortunately, most timers have been completely autonomous, requiring individual attention to set the correct time or change the operation of the device they control. For example, power outages may require the time to be reset in certain devices and changes in daylight hours from winter to summer may alter the desired operating times of those same devices. Furthermore, normal changes in day to day circumstances exacerbate these deficiencies. Someone planning a trip needs to place individual timers for each light to be controlled and may want to change the settings of heating and air conditioning to conserve energy while a dwelling is unoccupied.

Moreover, the process must be reversed upon return. Moving beyond the rudimentary automation offered by timers, more sophisticated devices have been developed to provide a greater degree of information and control. For example, a fire alarm system may include temperature sensors at several locations; a security system may provide a network of contact and motion sensors to identify open and/or occupied areas; a lighting system may control both natural and artificial light sources to maintain a particular luminosity. Common to the increase in sophistication of automation devices is the need for collecting and measuring data from multiple sources, and implicit in the multiple sensor paradigm is the need for interconnection. Having sensors interconnected naturally leads to the possibility of centralized monitoring and controlling for all automation systems. It is now possible to set a dwelling to "vacation mode" at a central panel rather than physically manipulating individual automation devices.

For new construction, interconnecting each of the sensors is relatively simple, but nevertheless may exact a significant expense. However, adding sensors and interconnections to existing structures presents a much more substantial problem and therefore a much greater expense. Because of the expense, automation systems with dedicated communication lines may be restricted to a fairly small portion of their potential market. One solution is provided by the X-10 protocol for controlling home automation equipment. X-10 uses standard electrical wiring, providing power to standard electrical sockets, for transmitting automation equipment signals. By eliminating the expense and effort of running dedicated communication channels, X-10 significantly expands the market for home automation systems.

Another simplification of home automation systems may include using a personal computer for monitoring and controlling various devices in place of a dedicated control panel. Personal computers are advantageous is this regard because a household contemplating home automation may already own a personal computer and be familiar with the various user interface components such that learning to use the system will be more intuitive. Unfortunately, traditional systems for monitoring home automation with a personal computer typically require the computer to be operating constantly, offsetting some of the energy conservation benefits that might otherwise accrue and possibly leading to other problems. For example, the noise and light generated by a computer is negligible under many circumstances but may prove undesirable during the night where other background noise and light it at a minimum.

BRIEF SUMMARY AND OBJECTS OF THE INVENTION

The foregoing problems in the prior state of the art have been successfully overcome by the present invention, which is directed to methods, systems and computer program products that enable the monitoring and controlling of automation equipment through a modem attached to a host. The invention is particularly useful given the increasing numbers of personal computers available in residential and commercial settings to fill the role of host. Furthermore, the development of improved technology and standards for adding automation equipment to existing facilities without requiring the installation of dedicated communication links provides an expanding market for the present invention.

In accordance with the monitoring aspect of the invention, a modem includes an automation interface capable of receiving data from the automation equipment. The automation interface includes means for recognizing a connection that has been established with the automation equipment. Once connected, the modem's processing means receives and interprets various automation equipment data. The interpreted automation equipment data are in a format that is amenable to storage. Having interpreted the data, the modem then stores the received data so that it may be retrieved later to give the automation equipment's status.

To allow for the controlling aspect of the present invention, the modem's automation interface also provides means for transmitting commands to the automation equipment. The modem includes means for receiving a command that is directed to the automation equipment. After receipt, the modem translates the command into a format that is suitable for transmission to the automation equipment. The means for transmitting then transmits the translated command so that it may be received by the automation equipment.

Another aspect of the invention is related to the modem having a remote communication interface for connecting to a remote user. Although the essence of modem communication is that of remote operation, the remote communication interface of the present invention offers significant advantages. Specifically, connecting through the remote communication interface allows a remote user to interact directly with the modem and the information it contains, as opposed to the typical host-to-host communication provided by prior art modems. This direct modem interaction allows the invention to be practiced when the host operates in a reduced capacity, such as a power saving mode wherein the host need only provide power to the modem. In this arrangement, the remote user can send and receive information, allowing for both remote monitoring and remote controlling of the home automation equipment.

Accordingly, it is an object of the present invention to monitor and control automation equipment by using a modem's processing and memory resources.

Another object of the present invention is to provide remote access to automation equipment without requiring the interaction of a host.

Yet another object of the present invention is to allow for a modem to monitor automation equipment while the host operates in a mode of reduced power consumption.

Still another object of the present invention is to provide for a modem to receive commands from a remote user and control automation equipment while the host operates in a mode of reduced processing and power consumption.

These and other objects, features and advantages of the present invention will be set forth in the description which follows, and in part will be more apparent from the detailed description of a preferred embodiments, and/or from the appended claims, or may be learned by actual practice of the invention.

BRIEF DESCRIPTION OF THE DRAWINGS

In order that the manner in which the above-recited and other advantages and objects of the invention are obtained, a more particular description of the invention briefly described above will be rendered by reference to the specific embodiments thereof which are illustrated in the appended drawings. Understanding that these drawings depict only the typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
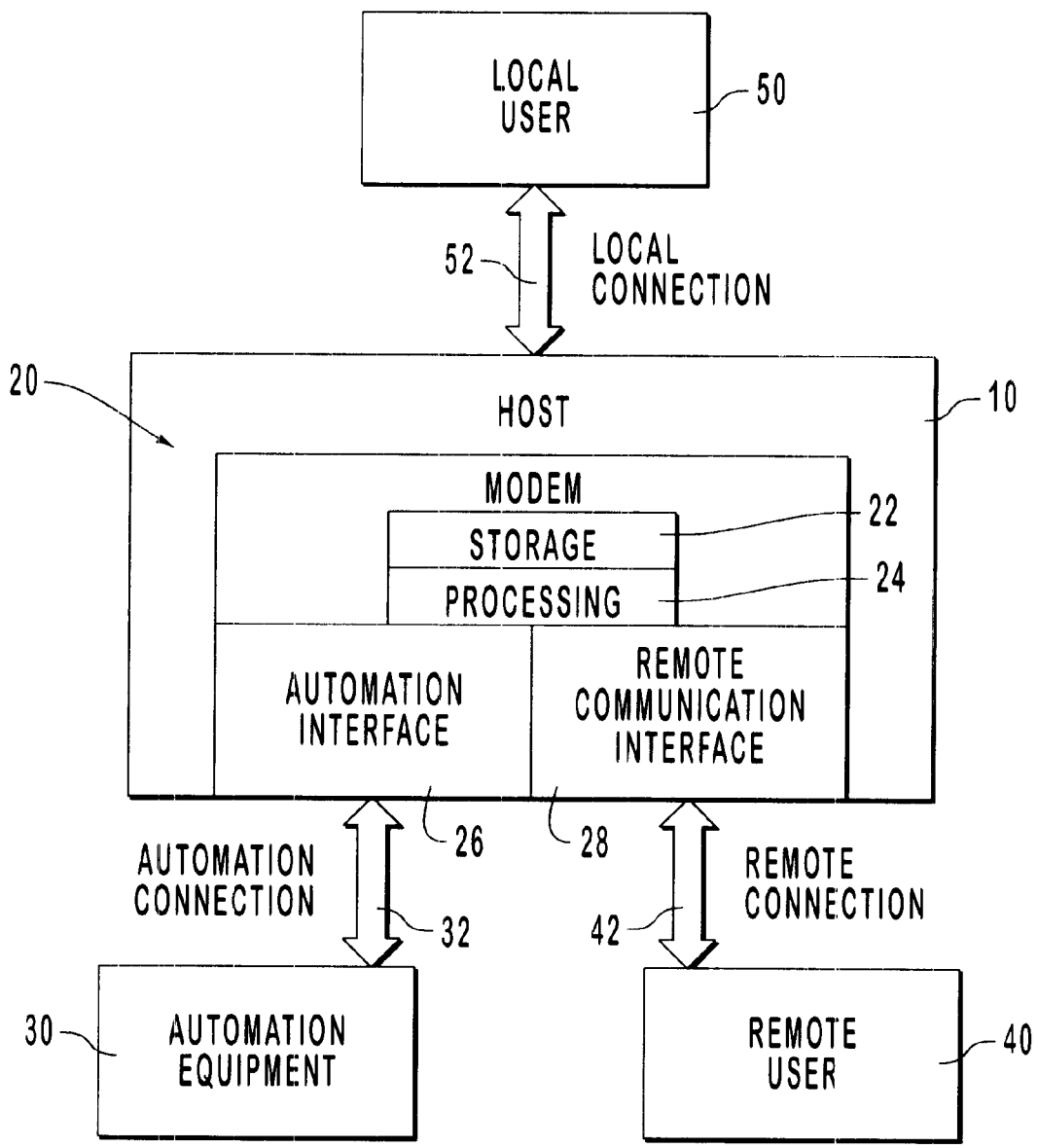
FIG. 1 is a block diagram illustrating the basic elements of an environment suitable for monitoring and controlling automation equipment according to the present invention.

The present invention is related to monitoring automation equipment using a modem attached to a host. The modem includes an automation interface for connecting to automation equipment, a processing means, and a storage means. Receiving data through its automation interface, the modem processing means interprets the received data and stores the result in the storage means. The stored interpretations may be retrieved later to obtain status information regarding the automation equipment.

A modem operating according to the present invention may also control automation equipment through its automation interface. The modem receives a command destined for the automation equipment. In order to transmit the command, the modem processing means translates the command into a format that is compatible with the communication channel used to connect the modem and automation equipment. The modem then transmits the translated command.

In addition, the present invention contemplates a modem having a remote communication interface. The remote communication interface allows the monitoring and controlling features described above to be accessed by a remote user. Unlike traditional remote access, the present invention may not require any participation on the part of the host. That is, a modem of the present invention is capable of establishing a remote user communication link as well as providing monitoring and control features to a remote user, all without depending on host processing resources.

The invention is described in further detail below by using diagrams to illustrate either the structure or processing of embodiments implementing the methods, systems and computer program products of the present invention. Using the diagrams in this manner to present the invention should not be construed as limiting of its scope. The embodiments of the present invention may comprise a special purpose or general purpose computer including various computer hardware, as discussed in greater detail below. The embodiments may further comprise multiple computers linked in a network environment.

In addition, embodiments within the scope of the present invention include computer readable media, or computer program products, storing computer-executable instructions or data structures. Such computer readable media may be any available media accessible by a general purpose or special purpose computer. By way of example, and not limitation, such computer readable media may comprise RAM, ROM, EEPROM, CD-ROM or other optical disk storage, magnetic disk storage or other magnetic storage devices. Computer readable media may also comprise any other medium capable of storing computer-executable instructions or data structures that can be accessed by a general purpose or special purpose computer, including instances where such access is accomplished via a public (e.g., the Internet) or a private network. Combinations of the above should also be included within the scope of computer readable media.

Turning now to FIG. 1, the functional components of a preferred embodiment implementing the present invention are illustrated. The basic functional components include host 10, modem 20, automation equipment 30, remote user 40, and/or local user 50 along with their corresponding interconnections. Host 10 may be selected from many possible computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communication network. In a distributed computing environment, program modules may be located in both local and remote memory storage devices.

In a preferred embodiment, host 10 is a general purpose computing device in the form of a conventional computer that includes a processing unit, system memory, and a system bus for coupling various system components, such as modem 20, to the processing unit. The system bus may be any of several types of bus structures including a memory bus or memory controller, a peripheral bus, and a local bus using any of a variety of bus architectures. Additionally, the system bus may also connect a variety of input devices to the processing unit using interfaces such as serial ports, parallel ports, game ports, universal serial bus ports, etc. Preferably, modem 20 connects to host 10 through either a PCMCIA system bus interface or through an available serial port.

Similarly, local user 50 is also connected to the processing unit of host 10 through an interface. Local user 50 may include a video monitor or other display device for receiving data from host 10 and a keyboard and/or mouse for inputting data to host 10. In the case of a video monitor, the host connection may be made through a video adapter interface attached to the system bus, where local connection 52 includes the video monitor cable. Keyboards are also generally connected through a dedicated interface, whereas a mouse may be connected through an available serial port or some other interface specific to the mouse. For a keyboard and mouse, Local connection 52 includes the corresponding keyboard and mouse cable.

However, given the wide variety of computing systems from which host 10 may be selected, an equally wide variety of options for local user 50 and local connection 52 should be considered. For example, local user 50 may also comprise a hand-held computing device with a wireless link for local connection 52. The only requirement for local user 50 and local connection 52 is the ability to exchange data and/or commands with host 10. Furthermore, there is no requirement that local user 50 necessarily includes a person. For example, local user 50 may comprise a log of automation equipment activity, a graphical display of the automation equipment's current status, programmed instructions to control the automation equipment, or any combination of the foregoing.

Modem 20 is also connected to host 10 and includes storage 22, processing 24, automation interface 26 and remote communication interface 28. Storage 22 is exemplary of means for storing the interpretation of data received from automation equipment 30. In a preferred embodiment, storage 22 comprises non-volatile RAM or NVRAM. However, storage 22 contemplates a variety of possible storage means, including all types of RAM, as well as any other means suitable for recording electronic data. The stored data may include a log of recent activity or the identification and/or status of certain connected automation equipment.

Processing 24 is exemplary of means for interpreting and means for translating the commands and data associated with the automation equipment. There are many means for processing that are well-known in the computer related arts, including general purpose central processing units, microprocessors having limited functionality, and special purpose controllers. A preferred embodiment of the present invention uses an application-specific integrated circuit or ASIC as processing 24. Nevertheless, the presence of an ASIC in a preferred embodiment should not be construed as a limitation; the current invention contemplates use of the above-named processor types as well as comparable processing means for other embodiments that are within the present invention's scope.

Likewise, automation interface 26 is not necessarily restricted to any particular specification, but is preferably an interface that may perform a variety functions. For example, automation interface 26 may provide means for interfacing with a cellular phone and/or a network. The only requirement for automation interface 26 is that it be capable of connecting automation equipment 30 with modem 20 through automation connection 32. Automation interface 26 provides means for receiving data from automation equipment 30. In certain preferred embodiments, automation interface 26 is a 15- or 26-pin connector commonly used to connect modems with cellular telephones. In addition to the many physical forms that are within the scope of the present invention, automation connection 32 may include a wireless link as well.

Automation equipment 30 may comprise a wide variety of residential and commercial devices for monitoring and controlling heating and air conditioning systems, lighting, irrigation systems, appliances, fire alarm and security systems, etc. The foregoing examples of automation equipment are only illustrative of some devices that are available and should not be interpreted as limiting the scope of the present invention. Like automation interface 26, automation equipment 30 needs to be capable of communicating through automation connection 32.

Although automation connection 32 appears as a single element, in practice it may comprise various components to provide a connection between automation equipment 30 and automation interface 26. For example, automation connection 32 may include a wireless component, requiring antennas and related circuitry. Automation connection 32 may include one or more modules for interfacing with electrical wiring (see the discussion of FIG. 2). It may include one or more dedicated cables; it may include combinations of the foregoing. Automation connection 32 is the means for establishing a connection between automation equipment 30 and modem 20.

Remote communication interface 28 includes means for connecting modem 20 with a remote user 40 using remote connection 42. Commonly, remote connection 42 includes a cable with RJ-type connectors for coupling the modem to a telephone line. However, remote communication interface 28 and remote connection 42 are not limited to any particular technology or layout. It is only necessary that remote connection 42 and remote communication interface 28 provide a means for remote user 40 to access modem 20. Although shown as a single element, remote connection 42 includes relatively sophisticated communication links, such as public switched telephone networks or PSTN, cable and satellite systems, Internet communication, wireless links, and the like. Thus, in addition to the variety of suitable connections for telephone lines, remote communication interface 28 also may be capable of connecting remote user 40 to modem 20 through a cable or satellite system or through some type of wireless link. Remote communication interface 28 is one example of means for receiving commands to be directed to the automation equipment. A preferred embodiment implements remote communication interface 28 as an RJ11 telephone line connector. However, this implementation is merely illustrative of a preferred embodiment and should not be interpreted as limiting the present invention's scope.

Remote user 40 is similar to local user 50 in functionality, the primary difference between the two being the form taken by remote connection 42 and local connection 52 and the resulting connection. Remote user 40 connects directly to modem 20 through remote communication interface 28 whereas local user 50 connects to modem 20 through host 10. Like local user 50, remote user 40 may comprise a wide variety of computing systems, including personal computers, hand-held devices, multi-processor systems, microprocessor-based or programmable consumer electronics, network PCs, minicomputers, mainframe computers, etc. The only requirement for remote user 40 and remote connection 42 is the ability to exchange data and/or commands with modem 20. Like local user 50, there is no requirement that remote user 40 necessarily includes a person. For example, remote user 40 may comprise a log of automation equipment activity, a graphical display of the automation equipment's current status, programmed instructions to control the automation equipment, or any combination of the foregoing.

Connecting automation equipment 30 and remote user 40 directly to modem 20 through automation interface 26 and remote communication interface 28 allows modem 20 to operate somewhat independently of host 10. By including processing 24 and storage 22, modem 20 is capable of exchanging data and commands with automation equipment 30 and remote user 40 without necessarily requiring the participation of host 10. For example, host 10 may be capable of operating in a "sleep" mode characterized by reduced processing and power consumption. In this mode, host 10 would continue providing power to modem 20, but one or more other components of host 10 would cease active operation.

New personal computers provide power-saving sleep modes in recognition that users are unwilling to shut down their machines during periods of inactivity due to the inconvenience imposed by restarting. Typically, personal computers used in a business setting are powered up upon the user's arrival and turned off only at the end of the day. Personal computers in other settings, such as those in homes or schools, may experience similar patterns of use. Likewise, laptop computers have long offered power-saving modes to prolong battery life. Most commonly, these power-saving modes are characterized by video displays shutting down, processors entering idle states while awaiting a signal to resume full operation, and drives spinning down.

Figure 2:
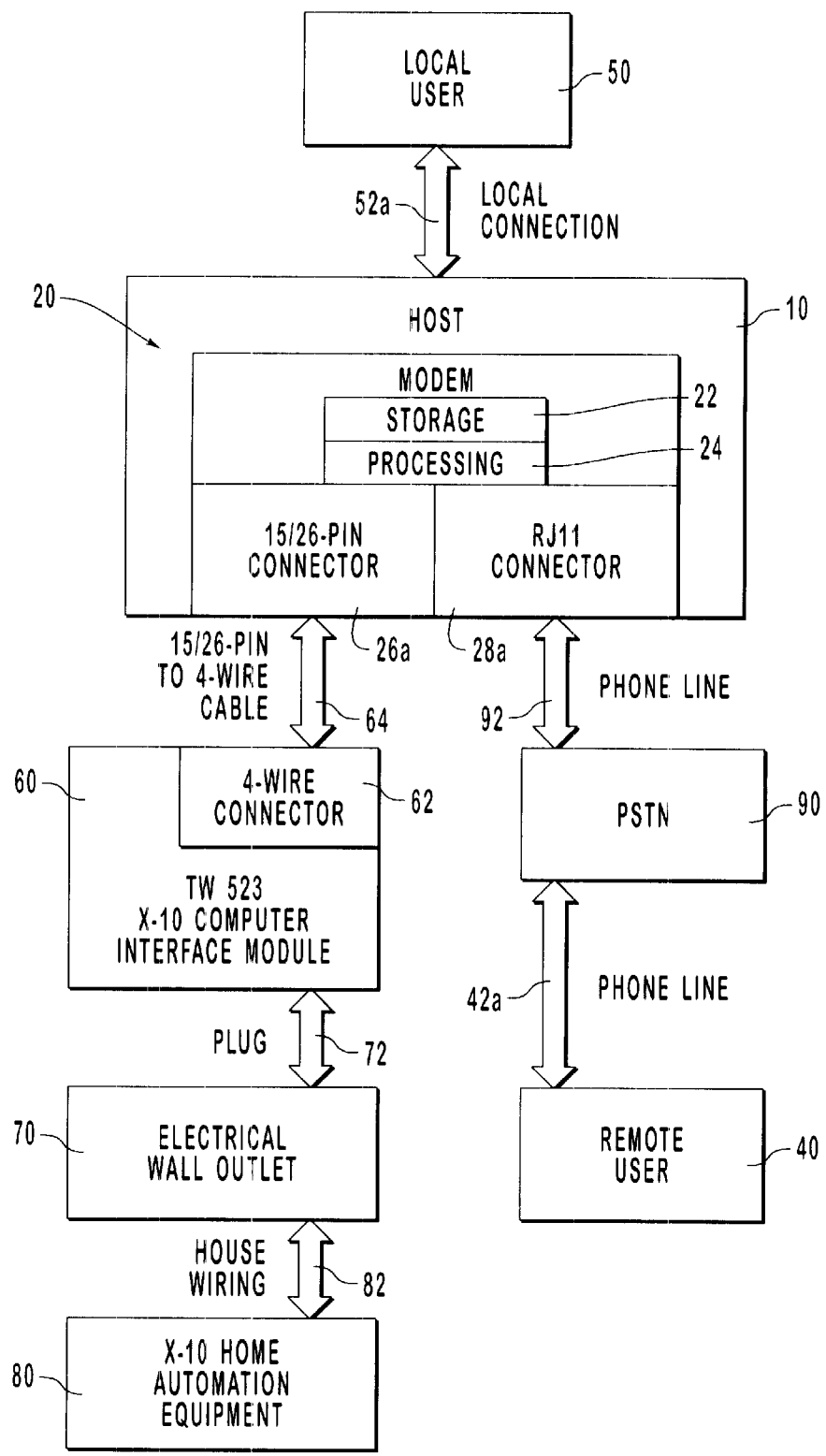
FIG. 2 is a more detailed block diagram presenting a typical environment for monitoring and controlling automation equipment according to the present invention.

With processing 24 and storage 22 accessible, modem 20 may interact with both automation equipment 30 and remote user 40 while host 10 remains in a sleep mode. In contrast, traditional modems are unable to function in this manner because they require host 10 to provide constant instructions and/or continuous storage and processing resources. Where host 10 is inactive, modem 20 may depend on processing 24 and storage 22, allowing host 10 to enter and remain in its sleep mode. Referring next to FIG. 2, a typical operating environment for a preferred embodiment of the present invention is illustrated. FIG. 2 focuses on the physical components that may be present in an X-10 home automation system, leaving the interaction between those components for a more detailed description in regard to FIGS. 4–7. Host 10 is a personal computer interfacing with local user 50 through a display, keyboard, mouse, and the associated cables as indicated by reference 52a. Modem 20 includes processing 24, storage 22, RJ11 connector 28a for communicating with remote user 40 through telephone line 92, and 15- or 26-pin connector 26a for communicating with X-10 home automation equipment 80 through 15- or 26-pin to 4-wire cable 64. In a preferred embodiment, cable 64 includes means for identifying its type (i.e., X-10, cellular, etc.). For example, cable 64 may include ROM that modem 20 reads to determine the type of data that can be expected through connector 26a.

As described earlier, X-10 is a communication protocol for home automation equipment that uses ordinary household electrical wiring as its transmission medium. Reference 60 identifies a TW523 X-10 computer interface module that connects to electrical wall outlet 70 through plug 72. Computer interface module 60 includes 4-wire connector 62 for receiving 15- or 26-pin to 4-wire cable 64. Cable 64 provides the connection between modem 20 and computer interface module 60. Computer interface module 60 reduces the processing burden that would otherwise be imposed on modem 20 to continuously monitor the power line and check all incoming signals, including noise, for validity. Any signals passed by computer interface module 60 are guaranteed to be valid X-10 codes. Furthermore, computer interface module 60 reads all codes it transmits. This allows modem 20 to verify that the code actually transmitted and the code that should have been transmitted are identical, any difference indicating either corruption by noise on the power line or a collision between multiple devices attempting to transmit at the same time. There is nothing in the present invention that requires using TW 523 X-10 computer interface module 60, the advantage is simply that it reduces the complexity and sophistication of the processing performed by modem 20.

Similarly, X-10 home automation equipment 80 may connect to house wiring 82 through an interface module to reduce the processing requirements that must be part of the home automation equipment, although FIG. 2 shows a direct connection. Interface modules, such as TW 523 X-10 computer interface module 60, may serve to reduce the development costs associated with automation equipment by limiting the functionality that must be provided. With a computer interface module eliminating extraneous signals, X-10 home automation equipment 80 need only understand X-10 codes provided by the module. However, the present invention is not limited in any manner by presence or absence of an interface module between X-10 home automation equipment 80 and house wiring 82.

Likewise, the exact components that connect remote user 40 to RJ11 connector 28a impose no limitation on the present invention. In a typical environment, RJ11 connector 28a connects to plain switched telephone network or PSTN 90 through an ordinary phone line 92. Remote user 40 makes a similar connection with PSTN 90 through phone line 42a.

It should be remembered that FIG. 2 presents an environment suitable for operating a preferred embodiment of the present invention, modem 20. The details for connecting local user 50, remote user 40, and X-10 home automation equipment 80 are all well-known in the art and are intended to provide context only. Moreover, the environment of FIG. 2 is exemplary only and should not be interpreted as limiting the invention's scope. For instance, the current invention could be used in connection with other automation environments instead of the X10 protocol. Other example environments include the LonWorks protocol, which is used for a distributed control system, or the CEBus (Consumer Electronics Bus) standard.

Figure 3:
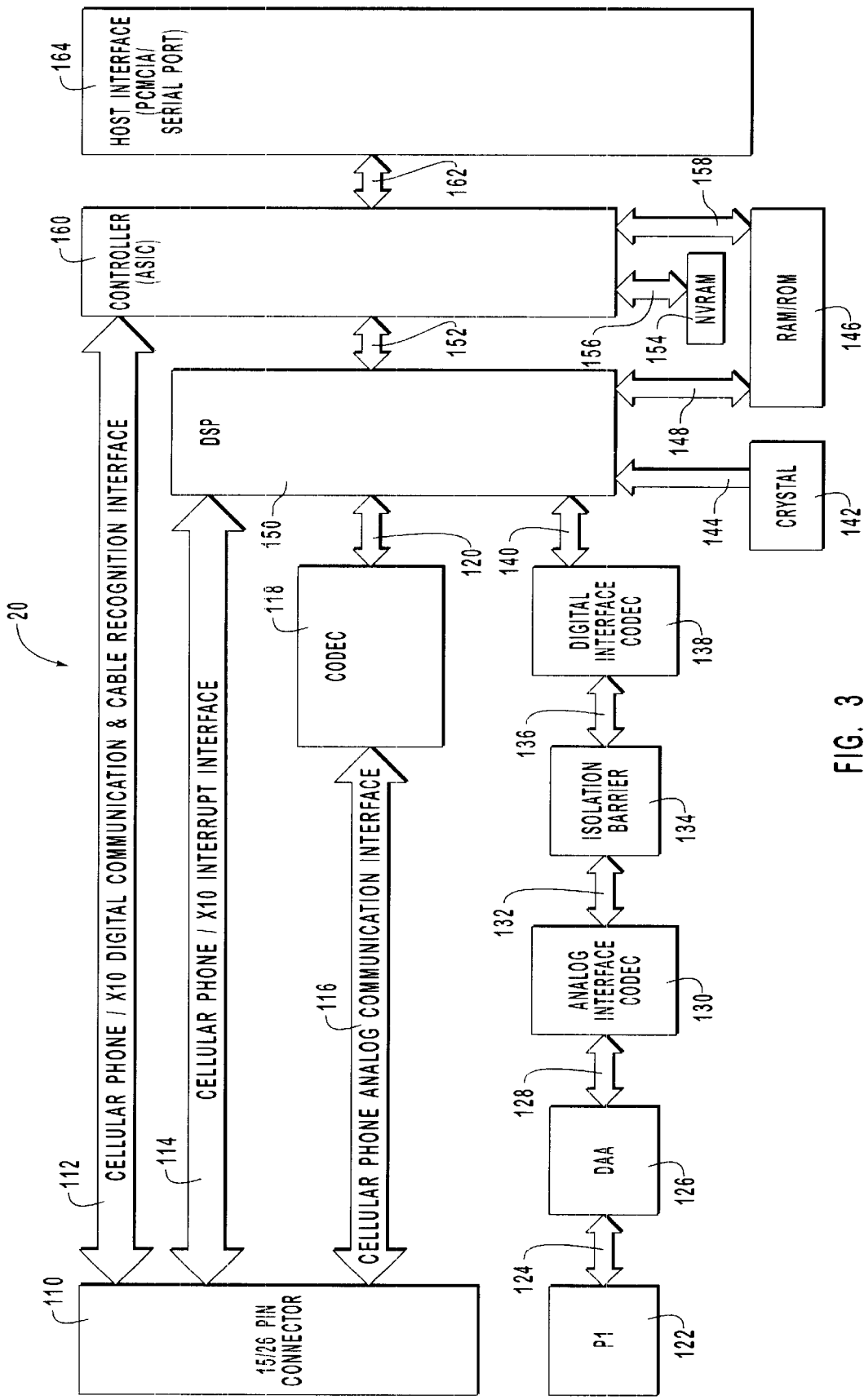
FIG. 3 is a block diagram showing the functional elements of a modem, according to a preferred embodiment of the present invention, for use in monitoring and/or controlling automation equipment.

Referring now to FIG. 3, a preferred embodiment of a modem implementing the present invention is illustrated.

Modem 20 includes three physical interfaces: host interface 164, 15- or 26-pin connector 110, and phone line interface 122. Host interface 164, through interconnections 162, enables communication between modem 20 and a host. In the preferred embodiment shown, host interface 164 may conform to either a PCMCIA or serial port interface. In the case of a serial port interface, modem 20 may also include a separate power connection, whereas as a PCMCIA interface would also function to power modem 20. Host interface 164 is another example of means for receiving commands to be directed to the automation equipment.

Telephone line interface 122 is preferably an RJ11 connector. The other functional components, DAA 126, analog interface Codec 130, isolation barrier 134, digital interface Codec 138, and DSP 150, as well as the interconnections between them, referenced as 124, 128, 132, 136, and 140, are well-know in the art of modem communication through a telephone line. Typically, a remote host uses telephone line interface 122 and the other functional components to establish a connection with modem 20. However, the telephone line interface 122 of the present invention is distinct from typical telephone interfaces in that it is able to function while the host for modem 20 operates in a state of reduced power consumption and processing. In contrast, a prior art telephone interface would only be operable in conjunction with a fully functioning host.

The operation of telephone line interface 122 is determined by controller 160. Controller 160 communicates with DSP 150 through interconnections 152. In a preferred embodiment as shown in FIG. 3, controller 160 is an application-specific integrated circuit or ASIC and is an example of the means for interpreting and means for translating that are part of modem 20. However, the invention poses no limitations that controller 160 be any particular type of processor or processing device and many other devices could be interchanged with the ASIC embodiment of controller 160, such as general purpose central processing units, microprocessors having limited functionality, and special purpose controllers.

Controller 160 accesses both instructions and data that are stored in RAM/ROM 146 through interconnections 158. RAM/ROM 146 includes instructions for controlling the operation of modem 20 and provides working memory for controller 160. For example, RAM/ROM 146 has instructions for establishing modem communication, perhaps with a remote user, through telephone line interface 122, for interacting with X-10 automation equipment and cellular telephones through connector 110, and for transferring information with a host through host interface 164. Furthermore, controller 160 may store information in non-volatile RAM or NVRAM 154, where NVRAM 154 is an example of the means for storing that is associated with the modem.

DSP 150 also has access to RAM/ROM 146, but through interconnections 148. RAM/ROM 146 includes instructions for performing certain signal processing operations by DSP 150 as well as some working memory. Additionally, crystal 142 provides DSP 150 with needed timing signals through interconnections 144. Controller 160 uses DSP 150 both in communicating through telephone line interface 122 as well as for communicating through connector 110.

For analog cellular telephone communication, DSP 150 transfers data through interconnections 120 to Codec 118. Codec 118 is specific to analog cellular telephone data and interfaces with connector 110 through cellular phone analog communication interface 116. Using modem 20 for analog cellular telephone communication is well-known in the art of modems and will not be described further.

To interact with X-10 automation equipment, modem 20 includes two additional interfaces with connector 110: cellular phone/X-10 interrupt interface 114 and cellular phone/ X-10 digital communication & cable recognition interface 112. The discussion of FIGS. 4–7, below, describes the operation of these two interfaces in greater detail. Nevertheless, for purposes of FIG. 3 and its representation of a preferred embodiment of the present invention, these interfaces will be described functionally here. Cellular phone/X-10 interrupt interface 114 generates an interrupt when a cable is inserted into or withdrawn from connector 110. The interrupt signals controller 160 to determine the type of connection to be supported through connector 110. For example, inserting a cable that carries X-10 automation equipment commands and data will generate an interrupt on interface 114. Controller 160 will then use cellular phone/ X-10 digital communication & cable recognition interface 112 to determine the type of connection, X-10 versus cellular, etc., and run the appropriate code for X-10 automation equipment. As described in regards to FIG. 2, above, a preferred embodiment of the cable will include means for determining the type of data that will pass through the cable. Similarly, withdrawal of a cable from connector 110 generates an interrupt so that controller 160 can recognize that a connection has been terminated.

Figure 4:
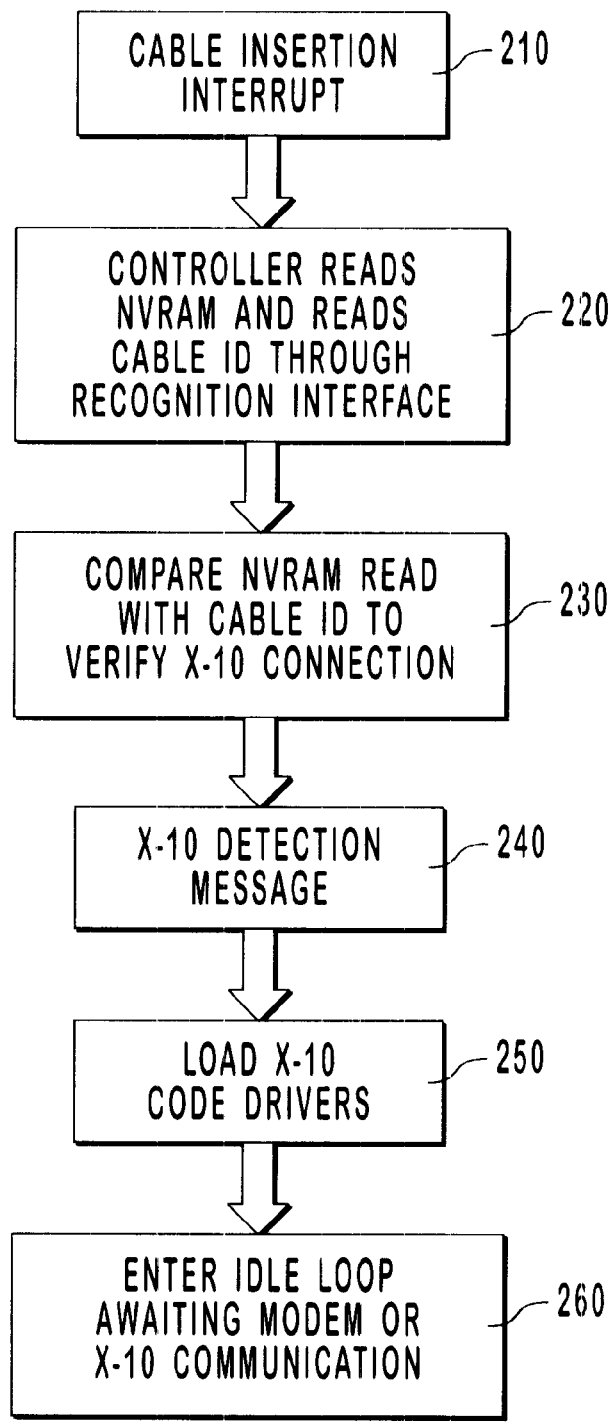
FIG. 4 is a flow chart illustrating the steps taken by a preferred embodiment of the present invention to detect the insertion of a cable for connecting automation equipment.

Moving next to FIG. 4, a flow chart including the steps taken by a modem, according to a preferred embodiment of the present invention, in establishing a communication link with X-10 automation equipment is shown. The modem first receives an interrupt signal, in step 210, that some type of cable has been inserted into an interface that supports X-10 automation equipment. The interface preferably supports other communication, such as cellular telephone data transmission. Upon receiving the interrupt signal, in step 220 a controller reads the cable ID, for example through recognition interface 112 of FIG. 3, and reads one or more identifiers from non-volatile RAM or NVRAM for use in determining the connection type. In step 230, the cable ID is compared with a corresponding identifier read from NVRAM to verify that an X-10 connection has been made through the inserted cable. The modem next provides an X-10 detection message as shown in step 240. For example, where host or remote software is actively monitoring any X-10 communication, the message may state that an X-10 module has been inserted. At this point, the modem knows that it likely will be sending and receiving X-10 data and commands, so the modem controller loads X-10 code drivers in step 250. Once the X-10 code drivers are loaded, the modem enters an idle loop in step 260 and waits for X-10 or modem communication.

Figure 5:
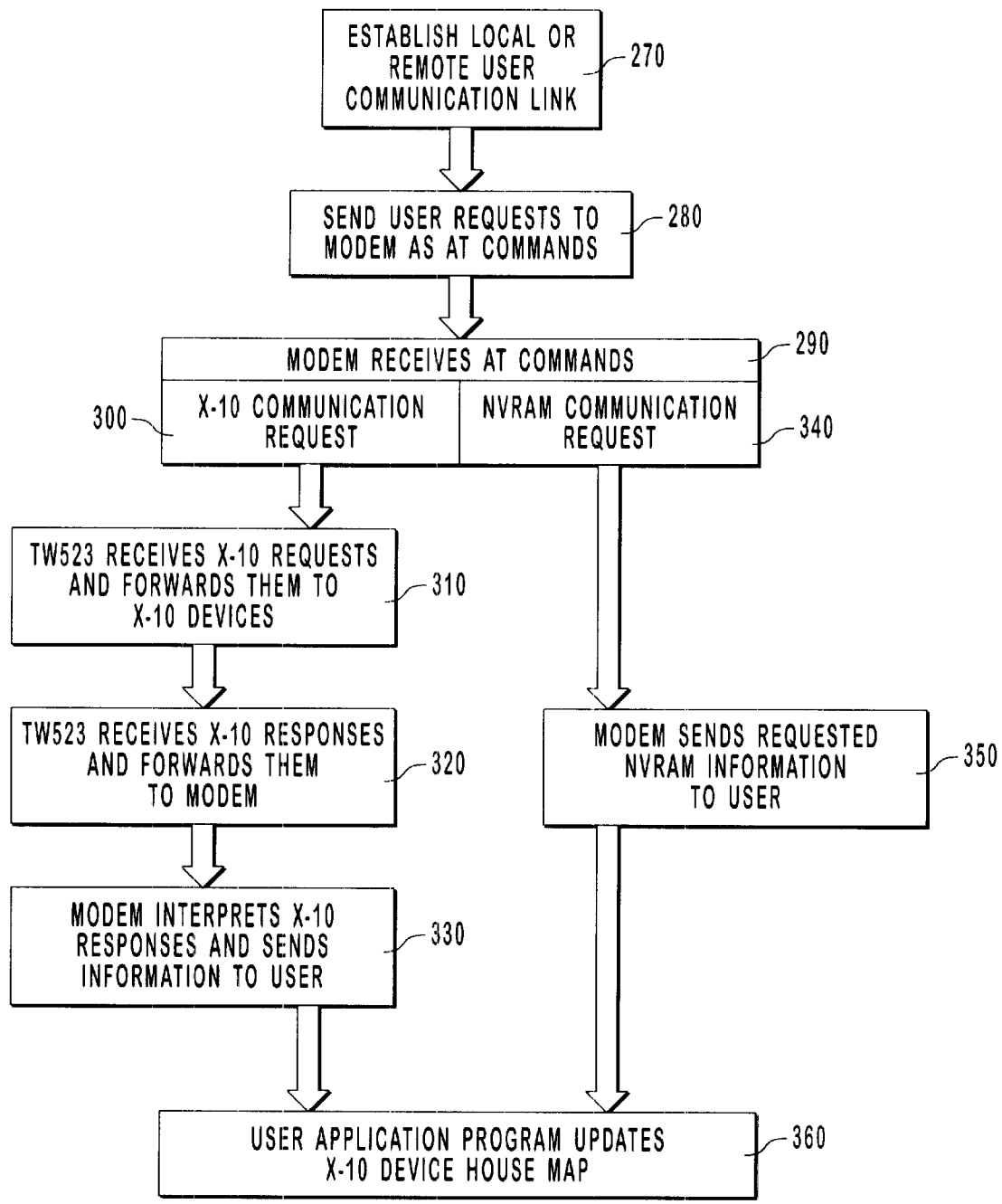
FIG. 5 is a flow chart showing the steps performed by a preferred embodiment of the present invention in fulfilling a user's automation equipment information request.

FIG. 5 shows the steps performed in a preferred embodiment of the present invention to fulfill a user's automation equipment request. In step 270, a communication link with either a local or remote user is established for receiving and sending X-10 automation equipment information. The user generates AT commands corresponding to the desired X-10 action as shown in step 280. (The AT command set is well-known in the art of modems.) In step 290, the modem receives the AT commands and divides each request into either of two possible alternatives. If the request can be met with information already stored by the modem, step 340 routes the request to the modem's NVRAM. (FIG. 6 describes how information is stored in the modem's NVRAM.) The modem then reads NVRAM and sends the requested information to the user in step 350.

If the modem determines that the desired information requires interaction with the X-10 automation equipment, step 300 identifies the request as an X-10 communication request. In step 310, the TW523 X-10 computer interface module, identified as reference 60 in FIG. 2, receives the X-10 requests and forwards it on to one or more X-10 devices. Next, in step 320, the TW523 receives X-10 responses from one or more X-10 devices and forwards the responses onto the modem. The modem interprets the received X-10 responses in step 330 and sends the information to the user. As shown in step 360, the user, whether local or remote, receives the requested information, either from step 330 or from step 350. Having received a response, an application program can report any results to the user, preferably by updating an X-10 device house map, but other means for reporting this information to a user are not precluded by the invention.

Figures 6, 7:
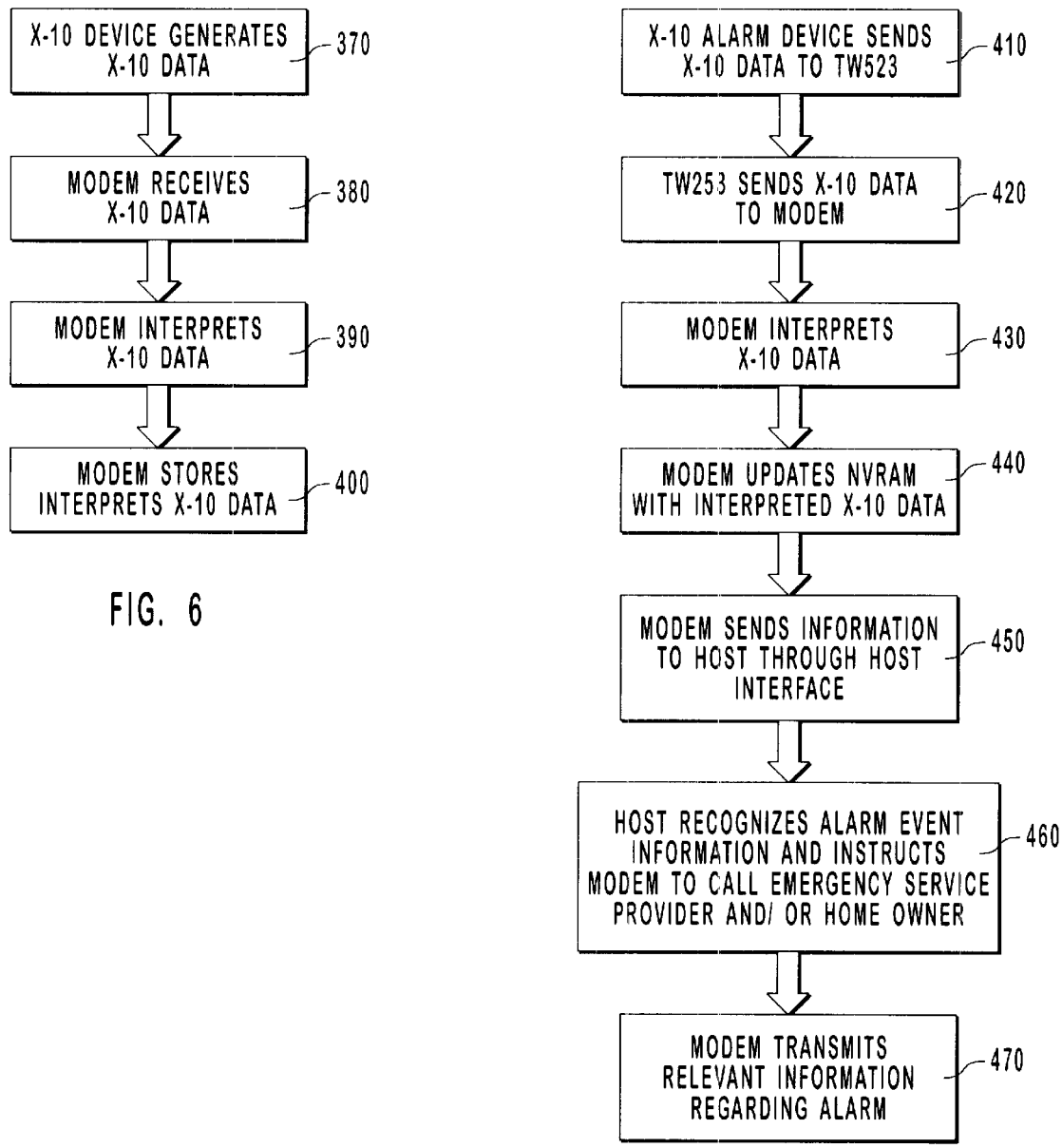
FIG. 6 is a flow chart depicting the steps executed by a preferred embodiment of the present invention in monitoring automation equipment.
FIG. 7 is a flow chart presenting the steps followed by a preferred embodiment of the present invention in response to an alarm signal generated by the automation equipment.

Considering next FIG. 6, the steps performed by a preferred embodiment in monitoring X-10 automation equipment is depicted. First, an X-10 automation device generates X-10 data, in step 370, that represents the status of the X-10 device. In step 380, the modem receives the X-10 data through a connection or communication channel linking the X-10 device and the modem. The modem then interprets received X-10 data in step 390. Finally, in step 400, the modem stores the interpreted X-10 data. The stored data in step 400 corresponds to the requested NVRAM information sent to a user in step 350 of FIG. 5.

Referring now to FIG. 7, a flow chart presenting the steps followed by a preferred embodiment of the present invention in response to an alarm signal generated by the X-10 automation equipment is presented. In FIG. 7, step 410 corresponds to the generation of data by an X-10 alarm device and sent to TW523 computer interface module, like the one identified as reference 60 in FIG. 2. The X-10 alarm device may be a burglar alarm, smoke detector, and the like. In step 420, computer interface module TW523 sends the received X-10 data to the modem. Next, the modem interprets the received X-10 data in step 430. Having interpreted the X-10 data, in step 440 the modem updates NVRAM so that the status of the automation equipment may be monitored. Additionally, in step 450 the modem sends information regarding the alarms to the host through a host interface like host interface 164 of FIG. 3. As discussed earlier the host is capable of operating in a sleep mode. Therefore step 450 may also include waking the host. In step 460, the host recognizes the received information as an alarm event and instructs the modem to call an emergency service provider and/or the home or business owner. Finally, in step 470, the modem transmits relevant information regarding the alarm. For example, the modem may transmit address information, the alarm type, phone number of the alarm location, etc.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for monitoring automation equipment through a modem attached to a host wherein the automation equipment includes at least one device, the method comprising the steps of:

establishing a connection between the automation equipment and the modem; and the modem performing the steps of:

receiving at least one data item from the at least one automation equipment device;

interpreting the received data item; and storing the interpretation of the received data item.

2. A method as recited in claim 1 wherein the modem stores the interpretation of the received data item in memory associated with the modem.

3. A method as recited in claim 1 wherein the host operates in a mode of reduced processing and power requirements while providing power to the modem.

4. A method as recited in claim 1 wherein the modem further performs the step of receiving from the host a request for information regarding the at least one automation equipment device.

5. A method as recited in claim 4 wherein the modem further performs the step of querying the at least one automation equipment device to fulfill the host's request for information.

6. A method as recited in claim 4 wherein the modem further performs the step of reading the stored interpretation to fulfill the host's request for information.

7. A method as recited in claim 1 wherein the modem performs the step of communicating, to a monitoring component, the interpretation of the received data item.

8. A method as recited in claim 1 further comprising the step of accessing the modem by a remote user.

9. A method as recited in claim 8 wherein the modem performs the step of receiving, from the remote user, a request for information regarding the at least one automation equipment device.

10. A method as recited in claim 8 wherein the modem performs the step of querying the at least one automation equipment device to fulfill the remote user's request for information.

11. A method as recited in claim 8 wherein the modem performs the step of reading the stored interpretation to fulfill the remote user's request for information.

12. A method as recited in claim 1 wherein the modem further performs the step of automatically sensing when it is connected to the at least one home automation equipment device.

13. A method for controlling automation equipment through a modem attached to a host wherein the automation equipment includes at least one device, the method comprising the steps of:

establishing a connection between the automation equipment and the modem; and the modem performing the steps of:

receiving at least one command to be directed to the at least one automation equipment device;

translating the received at least one command; and transmitting the translated command to the at least one automation equipment device.

14. A method as recited in claim 13 wherein the host provides power to the modem while the host operates in a mode of reduced power consumption and processing.

15. A method as recited in claim 13 wherein the modem further performs the step of automatically sensing when it is connected to the automation equipment.

16. A method as recited in claim 13 wherein the modem receives the at least one command to be directed to the at least one automation equipment device from the host.

17. A method as recited in claim 13 further comprising the step of accessing the modem by a remote user, wherein the modem receives the at least one command to be directed to the at least one automation equipment device from the remote user.

18. A method for monitoring and controlling home automation equipment through a modem attached to a host wherein the home automation equipment includes at least one device, the method comprising the steps of:
    establishing a connection between the home automation equipment and the modem; and
    the modem performing the steps of:
        receiving at least one command to be directed to the at least one home automation equipment device;
        translating the received at least one command;
        transmitting the translated command to the at least one home automation equipment device;
        receiving at least one data item from the at least one home automation equipment device;
        interpreting the received data item; and
        storing the interpretation of the received data item.

19. A method as recited in claim 18 wherein the modem stores the interpretation of the received data item in memory associated with the modem.

20. A method as recited in claim 19 wherein the modem performs the step of communicating, to a monitoring component, the interpretation of the received data item.

21. A method as recited in claim 20 wherein the modem receives the at least one command to be directed to the at least one automation equipment device from a monitoring component.

22. A method as recited in claim 20 wherein the modem receives the at least one command to be directed to the at least one automation equipment device from a remote user.

23. A method as recited in claim 22 wherein the host, while operating in a mode of reduced power consumption and processing, provides power to the modem.

24. A system for monitoring automation equipment wherein the automation equipment includes at least one device, the system comprising:
    a host;
    a modem connected to the host, the modem further comprising:
        means for receiving at least one data item from the at least one automation equipment device;
        means for interpreting the received data item; and
        means for storing the interpretation of the received data item; and
    means for establishing a connection between the automation equipment and the modem.

25. A system as recited in claim 24 wherein the means for storing the interpretation of the received data item is memory associated with the modem.

26. A system as recited in claim 24 wherein the host further comprises:
    means for operating in a reduced power consumption mode; and
    means for delivering power to the modem while operating in the reduced power consumption mode.

27. A system as recited in claim 24 wherein the modem further comprises means for querying the at least one automation equipment device in response to a request for information regarding the at least one automation device.

28. A system as recited in claim 24 wherein the modem further comprises means for reading the stored interpretation of the received data item.

29. A system as recited in claim 24 wherein the modem further comprises means for receiving a request for information regarding the at least one automation equipment device.

30. A system as recited in claim 24 wherein the modem further comprises means for allowing access to the modem by a remote user.

31. A system as recited in claim 24 wherein the modem further comprises means for communicating the stored interpretation of the received data to a monitoring component.

32. A system as recited in claim 24 wherein the modem further comprises means for automatically sensing when it is connected to the home automation equipment.

33. A system for controlling automation equipment wherein the automation equipment includes at least one device, the system comprising:
    a host;
    a modem connected to the host, the modem further comprising:
        means for receiving at least one command to be directed to the at least one automation equipment device;
        means for translating the received at least one command; and
        means for transmitting the translated command to the at least one automation equipment device; and
    means for establishing a connection between the automation equipment and the modem.

34. A system as recited in claim 33 wherein the host further comprises:
    means for operating in a reduced power consumption mode; and
    means for delivering power to the modem while operating in the reduced power consumption mode.

35. A system as recited in claim 33 wherein the means for receiving the at least one command to be directed to the at least one automation equipment device comprises means for receiving the command from the host.

36. A system as recited in claim 33, the modem further comprising means for access by a remote user, wherein the modem receives the at least one command to be directed to the at least one automation equipment device from the remote user.

37. A computer program product for implementing a method for monitoring automation equipment via modem wherein the automation equipment includes at least one device, the computer program product comprising:
    a computer-readable medium carrying computer-executable instructions for implementing the method wherein the computer-executable instructions comprise:
        program code means for receiving at least one data item from the at least one automation equipment device;
        program code means for interpreting the received data item; and
        program code means for storing the interpretation of the received data item; and
        program code means for establishing a connection between the automation equipment and the modem.

38. A computer program product as recited in claim 37 wherein the computer-executable instructions further comprise program code means for allowing access to the modem by a remote user.

39. A computer program product as recited in claim 37 wherein the computer-executable instructions further comprise program code means for communicating the stored interpretation of the received data item to a monitoring component.

40. A computer program product as recited in claim 37 wherein the computer-executable instructions further comprise program code means for automatically sensing when the modem is connected to the home automation equipment.

41. A computer program product for implementing a method for controlling automation equipment via modem wherein the automation equipment includes at least one device, the computer program product comprising:
  a computer-readable medium carrying computer-executable instructions for implementing the method wherein the computer-executable instructions comprise:
    program code means for receiving at least one command to be directed to the at least one automation equipment device;
    program code means for translating the received at least one command;
    program code means for transmitting the translated command to the at least one automation equipment device; and
    program code means for establishing a connection between the automation equipment and the modem.

42. A computer program product as recited in claim 41 wherein the computer-executable instructions further comprise program code means for receiving the at least one command to be directed to the at least one automation equipment device from the host.

43. A computer program product as recited in claim 41 wherein the computer-executable instructions further comprise program code means for allowing access by and receiving the at least one command from a remote user.

* * * * *